United States Patent
Bennett (10) Patent No.: US 6,697,904 B1
(45) Date of Patent: Feb. 24, 2004

(54) PREVENTING STARVATION OF AGENTS ON A BUS BRIDGE

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/536,570

(22) Filed: Mar. 28, 2000

(51) Int. Cl.⁷ .............................................. G06F 13/36
(52) U.S. Cl. ...................... 710/309; 710/310; 710/306; 710/106; 710/107; 710/113; 710/240; 710/241; 709/235; 370/229
(58) Field of Search ................... 710/240, 22, 107–117, 710/241, 53, 306, 309, 310; 709/234, 235; 367/134; 707/9; 370/329; 375/354

(56) References Cited

U.S. PATENT DOCUMENTS

| | | | | |
|---|---|---|---|---|
| 4,298,954 A | * | 11/1981 | Bigelow et al. ............... | 710/53 |
| 4,933,840 A | * | 6/1990 | Sera et al. ..................... | 710/22 |
| 4,953,081 A | * | 8/1990 | Feal et al. .................... | 710/111 |
| 5,276,681 A | * | 1/1994 | Tobagi et al. ............... | 370/229 |
| 5,291,459 A | * | 3/1994 | Andersen .................... | 367/134 |
| 5,305,446 A | * | 4/1994 | Leach et al. .................. | 712/34 |
| 5,365,552 A | * | 11/1994 | Astle .......................... | 375/354 |
| 5,410,652 A | * | 4/1995 | Leach et al. ................. | 370/450 |
| 5,440,691 A | * | 8/1995 | Carrafiello et al. ......... | 709/234 |
| 5,448,701 A | * | 9/1995 | Metz et al. .................. | 710/113 |
| 5,535,341 A | * | 7/1996 | Shah et al. .................. | 370/402 |
| 5,546,543 A | * | 8/1996 | Yang et al. .................. | 709/235 |
| 5,956,489 A | * | 9/1999 | San Andres et al. ........ | 709/221 |
| 6,073,132 A | * | 6/2000 | Gehman ........................ | 707/9 |

OTHER PUBLICATIONS

M. Morris Mano, Computer System Architecture, 1982, Prentice–Hall, Inc., 2nd edition, pp. 26–35.*

* cited by examiner

Primary Examiner—Gopal C. Ray
Assistant Examiner—Justin King
(74) Attorney, Agent, or Firm—John F. Travis (57) ABSTRACT

A round robin bus arbitrator that prevents bus starvation caused by an inbound buffer becoming full and forcing repetitive retries by an agent. The arbitrator performs a rotating scan of the request lines of multiple potential bus requesters. When a request is detected, the arbitrator stops, grants the request, and resumes scanning after the requester takes control of the bus. If the data buffer on a write operation becomes full and cannot accept any more data, a signal so indicating is sent to the arbitrator. The arbitrator then stops scanning, or refuses to resume scanning if it is already stopped, until the buffer indicates it is no longer full. The next requester that is granted the bus is therefore not confronted with a full buffer, and not thereby forced to abort the request and make a retry. The invention avoids bus starvation caused by a second bus requestor repeatedly being given a retry response because the buffer is repeatedly filled up by an earlier bus requestor.

22 Claims, 8 Drawing Sheets

PREVENTING STARVATION OF AGENTS ON A BUS BRIDGE

BACKGROUND OF THE INVENTION

1. Field of the Invention

The invention pertains generally to computers. In particular, it pertains to arbitrating data transfers on a computer bus.

2. Description of the Related Art

Figure 1:
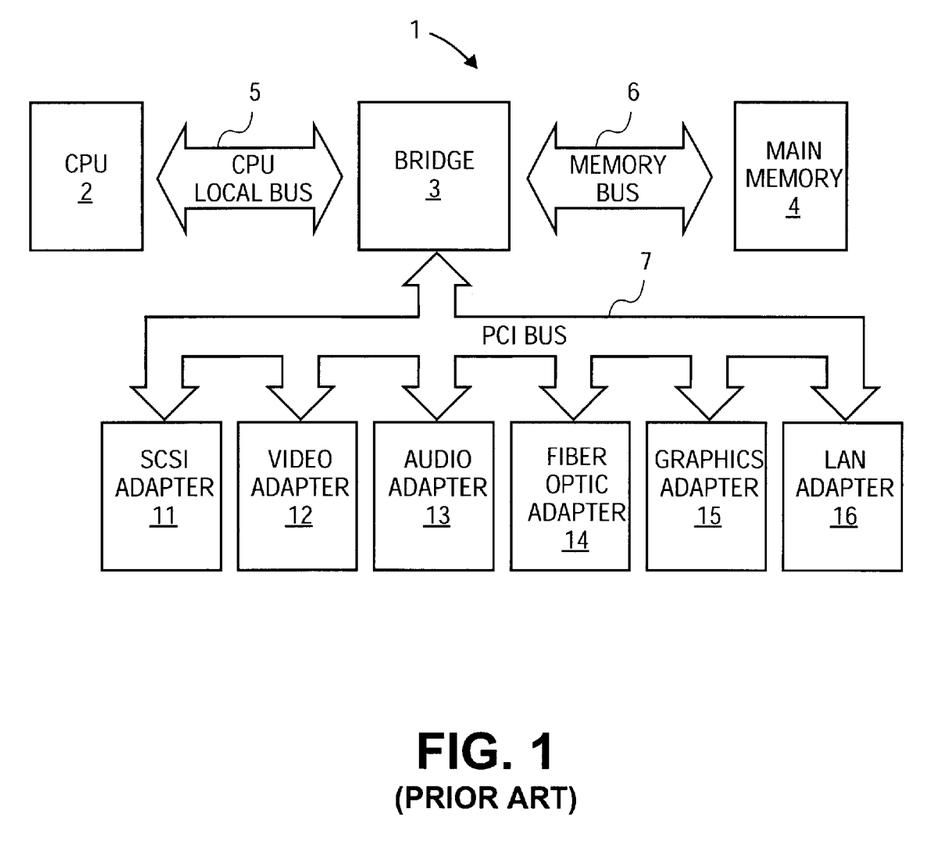
FIG. 1 shows a prior art system containing a PCI bus.

Modern computer systems may use a variety of buses to transfer data from one device to another. As seen in FIG. 1, a computer system 1 may include a local bus 5 to transfer data to/from a central processing unit (CPU) 2, a memory bus 6 to transfer data to/from a main memory 4, and a Peripheral Computer Interconnect (PCI) bus 7 to transfer data to/from any of multiple adapters 11–16. The system may also include a bridge 3 to permit transferring data between devices on two different buses.

Figure 2:
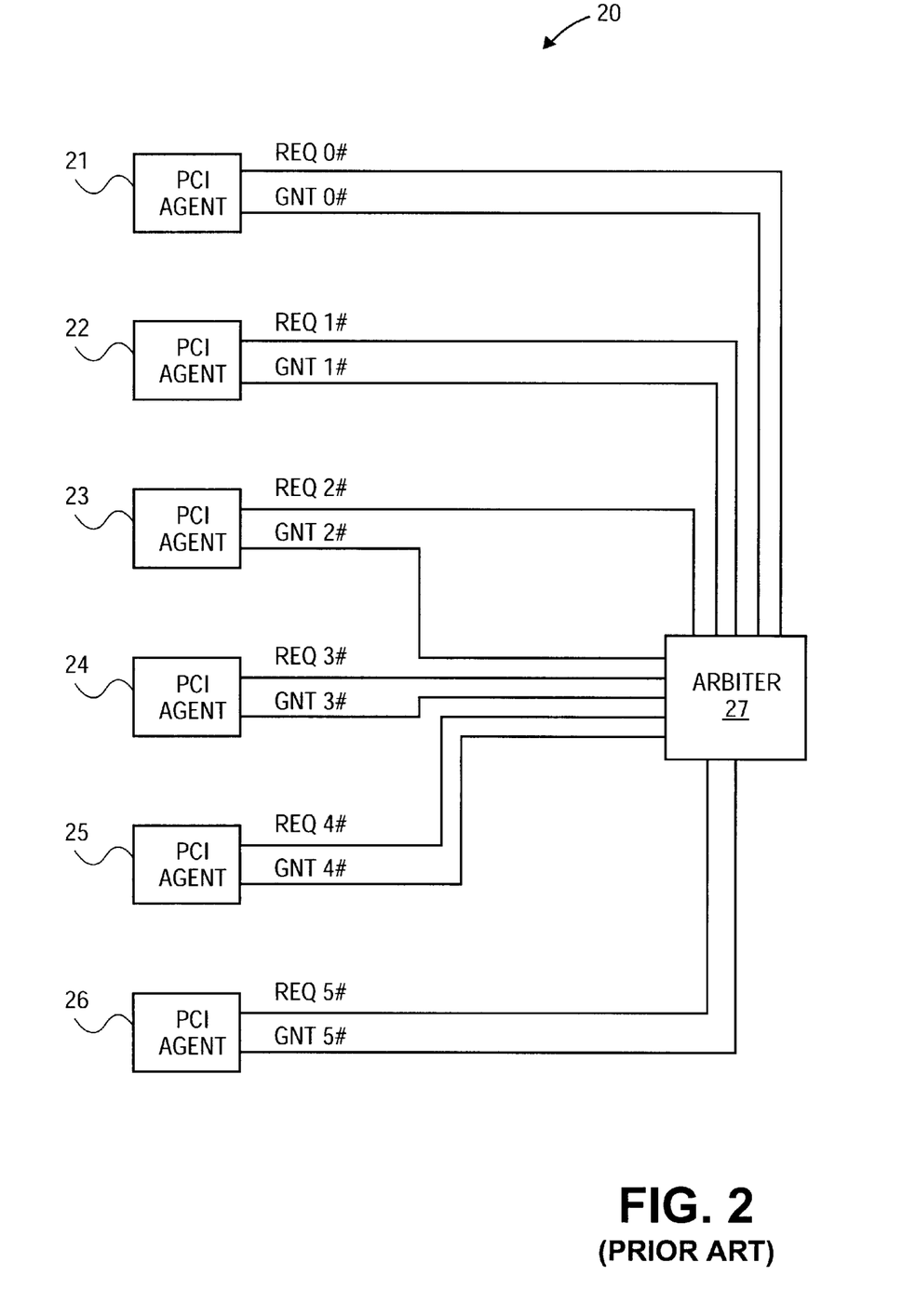
FIG. 2 shows a PCI arbitration system.

PCI bus systems are a well-known, industry-standardized approach for transferring data within a computer system. As with many bus systems, a device wishing to initiate a transfer between itself and another device must request and be granted the exclusive use of the bus for a period of time. Since more than one device may request the bus at the same time, an arbiter is necessary to determine which requester will be granted immediate use of the bus and which requestors must wait. FIG. 2 illustrates one such system, in which the various adapters 11–16 of FIG. 1 are shown generically as PCI agents 21–26. Any agent wishing to use the PCI bus places a request signal on its respective REQ line to arbiter 27. If two or more agents are requesting the bus at the same time, arbiter 27 will choose one of those requesters by placing a grant signal on the GNT line to that requester. When the granted device has finished with the bus, another arbitration determines which of multiple requesters will be granted access next. When a requester is given control of the bus its target device (the device with which the requester wishes to communicate data) may not be able to accept a data transfer. If not, the requestor will receive a retry indication from the target and must relinquish the bus. The requestor retries by sending another request signal to arbiter 27.

Figure 3:
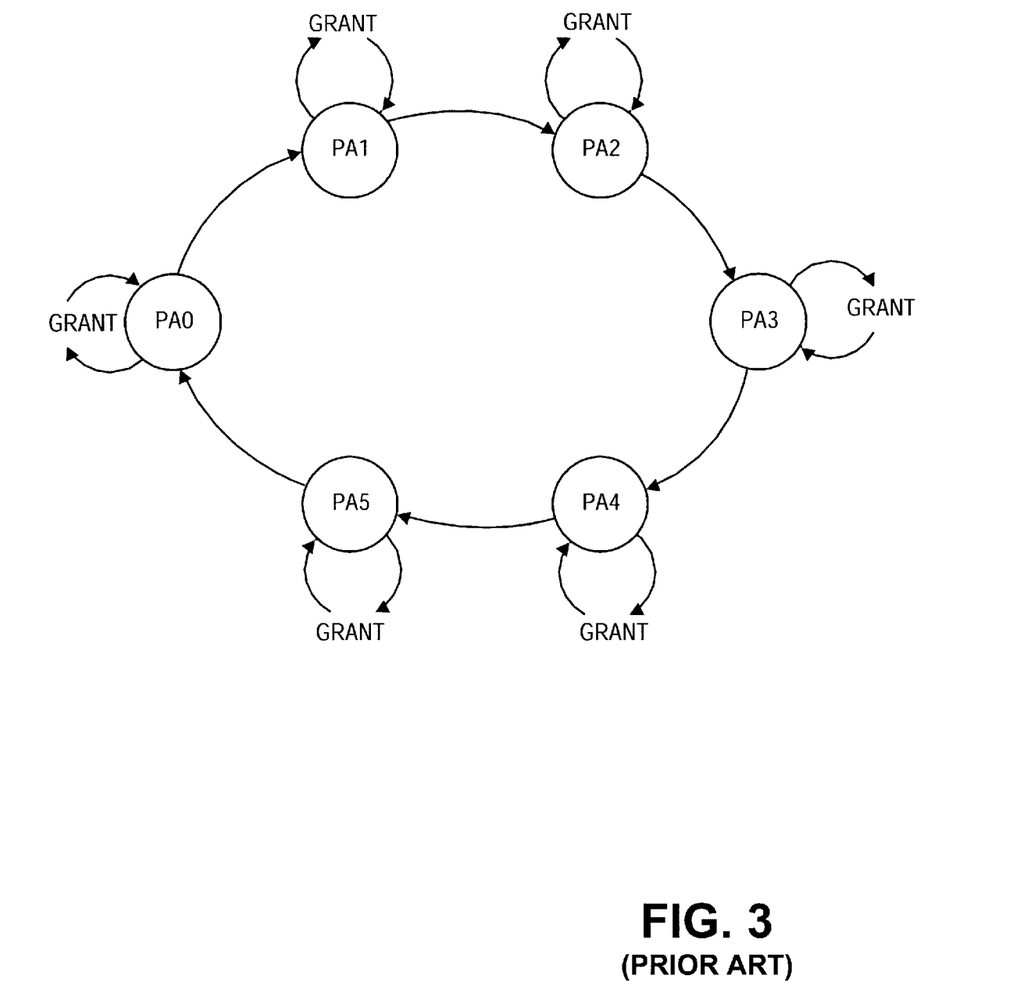
FIG. 3 shows a flow diagram of a rotating priority scheme.

Various techniques have been developed to perform this arbitration in arbiter 27, such as first-come first-serve, hierarchical, and round robin, all of which are well known. FIG. 3 illustrates the round robin, or rotating, method of arbitration in a system with six PCI agents that can potentially request the PCI bus at any time. The arbiter scans the request lines from PCI agents PA0–PA5 by continuously examining the request lines in circular order, looking for a request signal on each line. When it detects a request signal, it stops scanning, grants bus access to the associated device by issuing a grant signal to that device, and subsequently resumes scanning. This technique gives equal priority to all requesters, since every device is given a chance to request the bus in every scan cycle.

The conventional location for arbiter 27 is in bridge 3, which also includes a first-in first-out buffer (FIFO) to buffer the data as it is transferred between a device on the PCI bus and a device on one of the other buses, typically the memory bus. Any PCI device making a write transfer to a target device on another bus can transfer the data to this FIFO, and the data is then transferred from the FIFO to the target device. Depending on the volume of data being transferred and the size of the FIFO, the FIFO may become full, so that any further data transfer would overrun the FIFO and cause corruption of the data. To prevent this, when the FIFO becomes full, any further data transmission into the FIFO is halted until more data has been removed from the FIFO by the receiving device. In a typical system, if the FIFO becomes full in mid-transfer, the FIFO will send a STOP indication to the transmitting device. The transmitting device will then stop the transfer, relinquish the bus, and subsequently make another bus request to resume the transfer when it is again granted the bus. By the same token, if a requesting device is granted access to the bus but the FIFO is already full, the requestor will receive a STOP indication from the FIFO before any data is transferred. As before, it must drop the request, relinquish the bus and retry later. In a conventional round robin arbiter, these conditions can create a situation called starvation, in which one requestor is repeatedly denied access while another requester is repeatedly granted access. For example, if device A requests and is granted the bus, it can transfer enough data to fill up the FIFO before terminating the transfer. If device B is then granted the bus while the FIFO is still full, it will receive a retry response and must drop the request. As the next requesting device in the rotation, device A may request and be granted the bus again. The FIFO has by then had time to free up some space, which device A proceeds to fill up again. Device B will then get another chance to request access, and will again receive a retry, since the buffer is by now full again. In this manner, device A will be granted access every time it makes a bus request, while device B will never be granted access until device A has completed all transfers. This defeats the purpose of rotating priority, which is to give every device equal access to the bus.

SUMMARY OF THE INVENTION

An embodiment of the invention includes arbitration logic to repetitively scan first and second bus request lines. The arbitration logic has a first input coupled to the first request line to receive a first request signal, a first output to provide a first grant signal in response to receiving the first request signal, a second input coupled to the second request line to receive a second request signal, a second output to provide a second grant signal in response to receiving the second request signal, and a third input to receive a buffer full signal. The arbitration logic also includes control logic coupled to the first, second, and third inputs to pause the scan in response to receiving the buffer full signal.

DETAILED DESCRIPTION OF THE INVENTION

Figure 4:
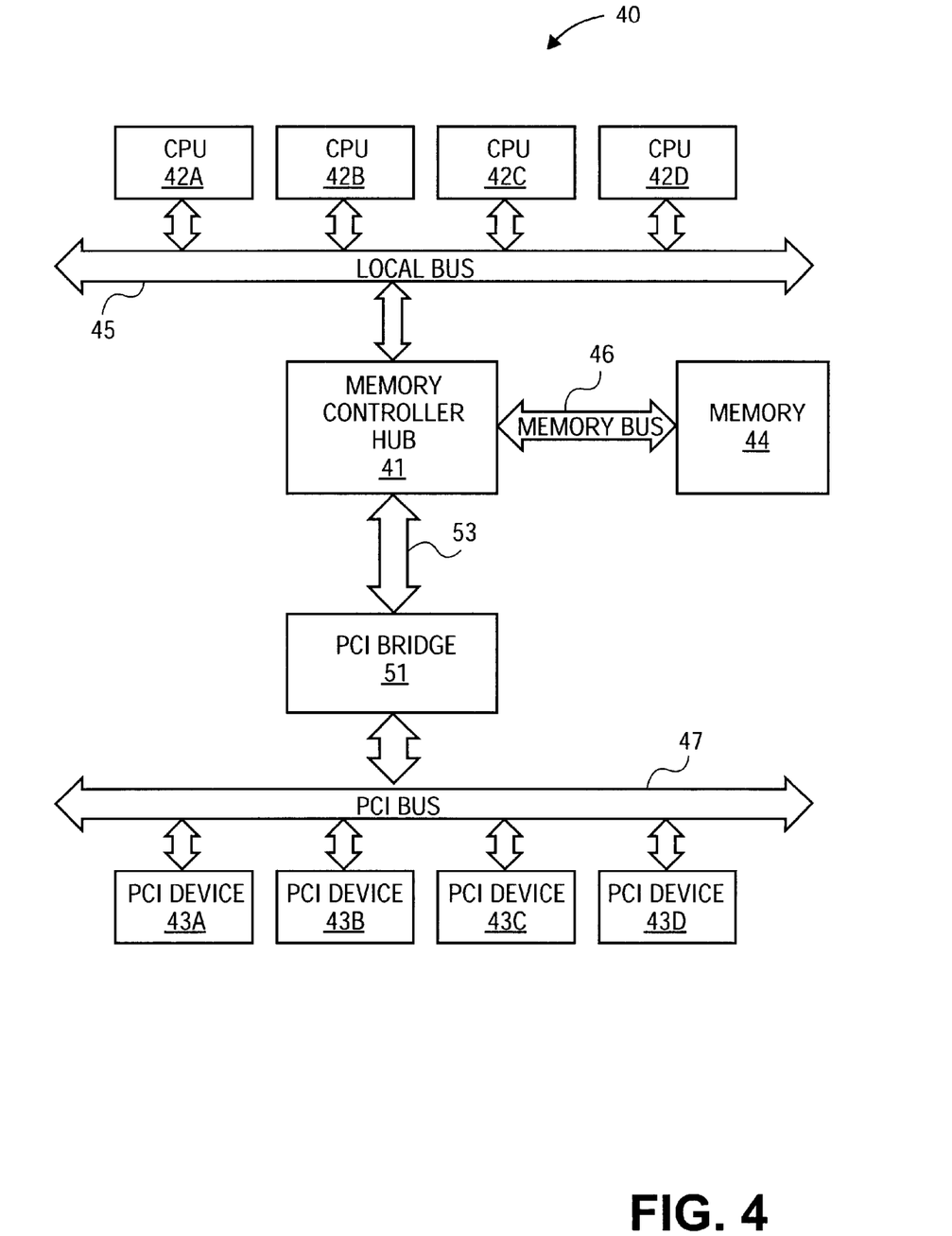
FIG. 4 shows a system of the invention.

FIG. 4 shows a system containing the invention. Multiple CPU's 42A–42D can communicate over local bus 45 with memory controller hub 41, which in turn interfaces with memory 44 over memory bus 46 and also interfaces with PCI bridge 51 over internal bus 53. PCI bridge 51 communicates with various PCI devices 43A–43D over PCI bus 47. A PCI device requesting a write data transfer to memory 44 makes the request to an arbiter in PCI bridge 51. Once access is granted by the arbiter, a data transfer takes place from the PCI device through PCI bus 47, through a FIFO in PCI bridge 51, through internal bus 53 to memory controller hub 41, and to memory 44 through memory bus 46. A read data transfer would travel the same path in the opposite direction.

Figure 5:
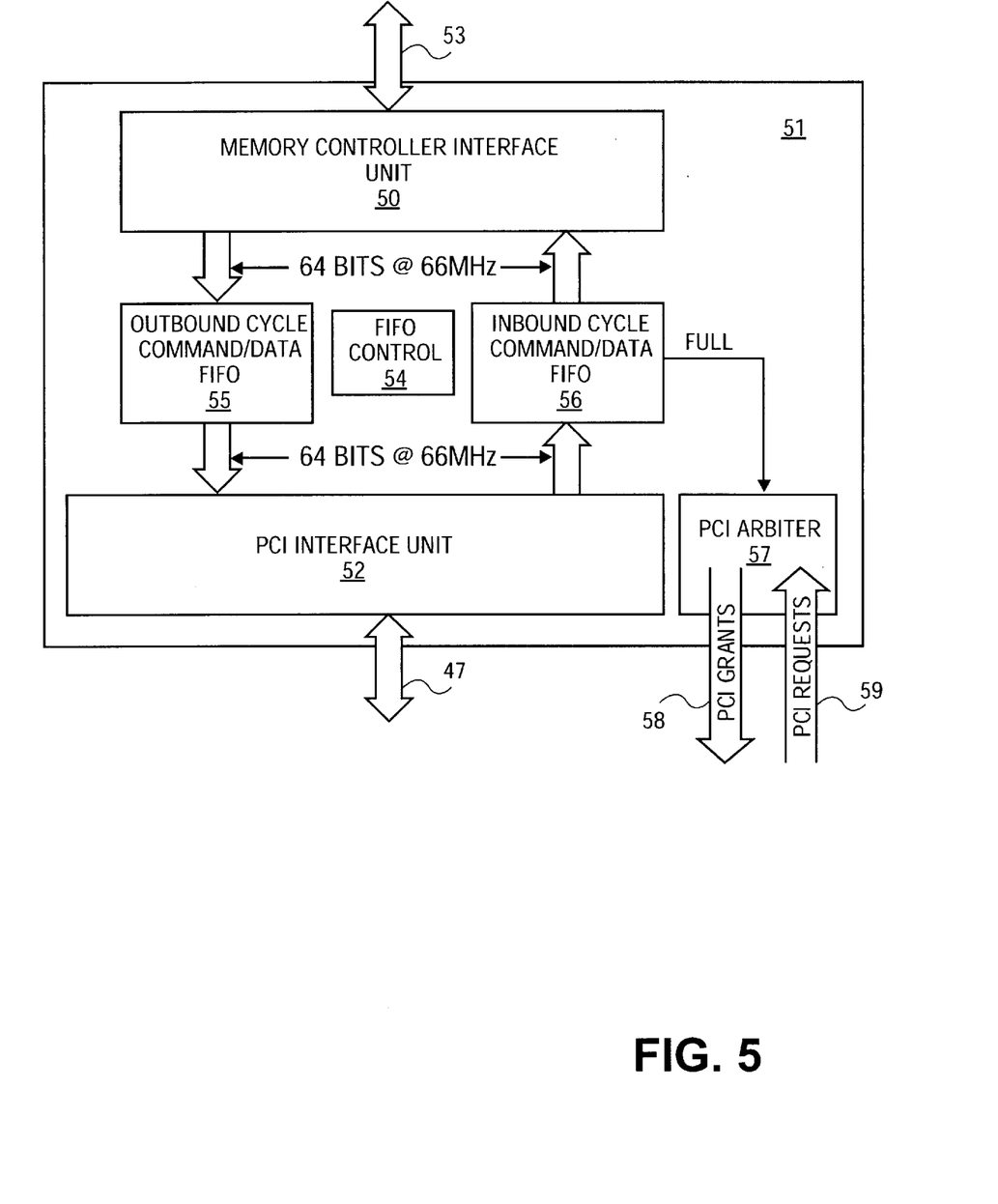
FIG. 5 shows a PCI bridge of the invention.

FIG. 5 shows a more detailed view of PCI bridge 51. Bridge 51 interfaces to internal bus 53 with memory controller interface unit 50, which contains the proper logic and timing signals to transfer data over internal bus 53. Bridge 51 also interfaces to PCI bus 47 with PCI interface unit 52, which contains the proper logic and timing signals to transfer data over PCI bus 47. Bridge 51 contains two FIFOs, one for each direction. Commands or data going from a PCI device to memory are routed through inbound FIFO 56, while commands or data going in the opposite direction are routed through outbound FIFO 55. Both FIFOs are under the control of FIFO control logic 54.

In one embodiment, data is transferred between PCI interface unit 52 and FIFOs 55, 56 over a 64-bit wide data path operating at 66 megahertz (MHz). These parameters should be matched to the PCI bus. Depending on which version is used, PCI bus data paths can be 32 or 64 bits, while the PCI bus clock can be 33 or 64 MHz. Other parameters may also be included in future PCI specifications.

Each PCI device 43A–43D has a separate request line to PCI arbiter 57, shown collectively as PCI requests 59. Similarly, each PCI device has a separate grant line from PCI arbiter 57, shown collectively as PCI grants 58.

During a write operation from a PCI device to memory, inbound FIFO 56 may become full, preventing further data from being written into FIFO 56 by the PCI device. This condition can be indicated by sending a "Full" signal to arbiter 57, which arbiter 57 can use to prevent any grants that might result in bus starvation for subsequent requests by other PCI devices. There is no need to send a similar "full" signal from outbound FIFO 55 on read operations. Although a memory read operation by a PCI device can fill up FIFO 55, the requesting PCI device will not relinquish the PCI bus until all the requested data has been transferred from FIFO 55 to the PCI device. By this time, FIFO 55 is empty, not full. Since a new grant is not determined until just before the PCI bus is relinquished, FIFO 55 will never be full at the time the grant is made and the previously described starvation situation will not occur.

Figure 6:
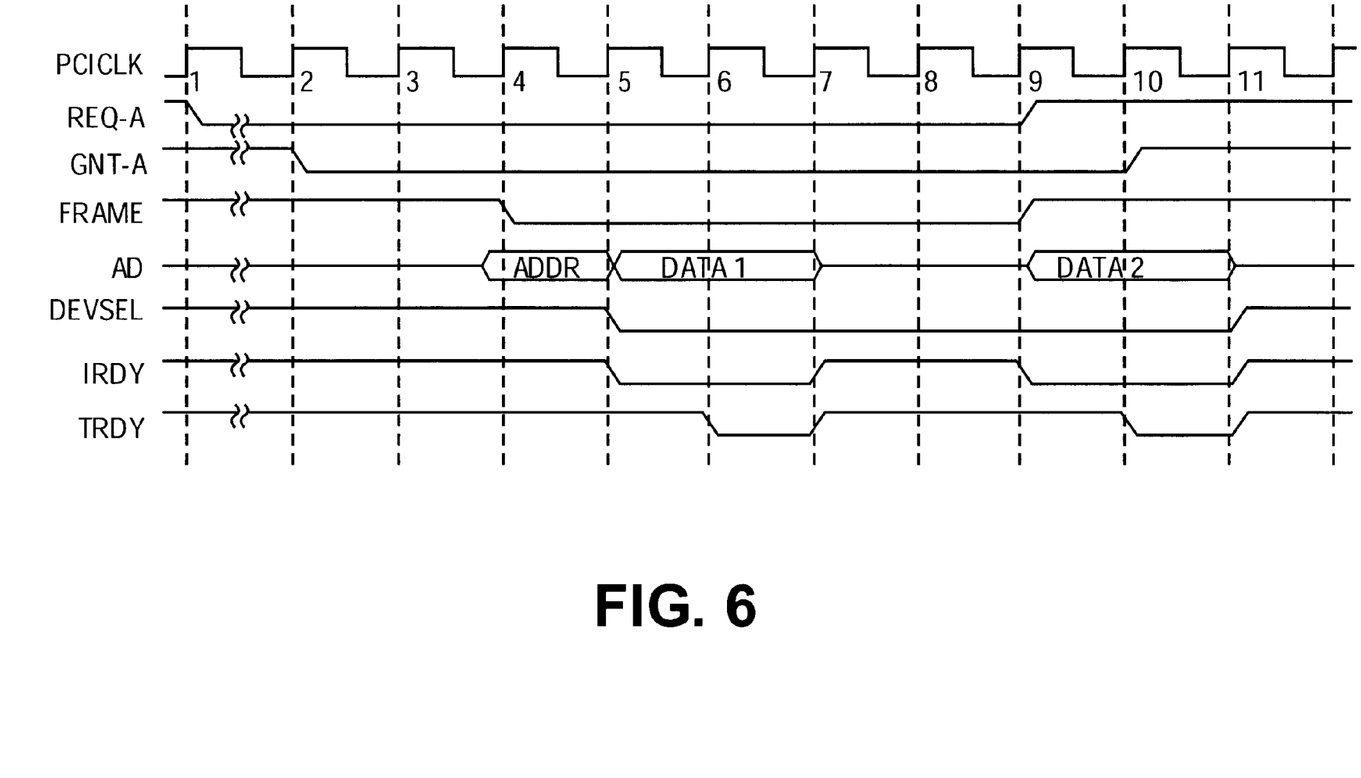
FIG. 6 shows a timing diagram of a PCI bus transfer.

FIG. 6 shows the timing of signals on a PCI bus. The leading (rising) edge of clock signal PCICLK is used to clock the remaining control signals. All the signals shown are asserted by driving them low. Each PCI device that can act as a master (also referred to herein as an initiator or requester) has its own REQ and GNT lines, but only the request and grant lines for a PCI device "A" are shown in the example of FIG. 6. All the other signals in FIG. 16 are common bus lines that are shared by all the devices on the PCI bus. It should be noted that a standard PCI bus contains other signal lines not shown, but they are not important to an understanding of the invention and have been omitted for simplicity. It should also be noted that not all PCI devices can act as masters (such as memory devices, which typically cannot initiate transfers), and therefore not all PCI devices will have REQ and GNT lines. The PCI standard is well known in the art.

A PCI device A makes a request for the PCI bus by asserting its individual REQ-A line to the arbiter, as shown at clock cycle 1. The request is granted when the arbiter asserts the GNT-A line associated with that request line. Although GNT-A is shown being asserted at clock 2, an indeterminate number of clock cycles may occur between REQ-A and GNT-A, depending on how the arbitration proceeds. After receiving GNT-A, the requestor may not get control of the bus immediately if a previous transfer is still in progress. Typically on a PCI bus, the granted device must sample FRAME and IRDY on the leading edge of each PCICLK to determine if the bus is still in use by another device. This feature is not shown in FIG. 6, which assumes the bus is idle at clocks 1 and 2.

When both FRAME and IRDY from a previous transfer are deasserted by the devices participating in that previous transfer, the bus is idle and the requestor can then take control of the bus by placing the address of the target device on the address/data lines AD, and asserting FRAME as shown at clock 4. FRAME will remain asserted throughout most of the following transfer sequence. The target device will recognize its own address and assert DEVSEL at clock 5 to indicate it has recognized and accepted the request for a transfer. DEVSEL remains asserted throughout the transfer sequence.

A PCI bus transfers the target address and the data over the same address/data (AD) lines. After transferring the address as just described, all the following transfers on the AD lines are considered data. In a write operation, the PCI master places the first data segment on the AD lines and signals the data is ready by asserting the Initiator Ready (IRDY) signal as shown at clock 5. The target indicates it is latching the data by asserting Target Ready (TRDY) as shown at clock 6. Both IRDY and TRDY are deasserted on the following clock. In one embodiment, the PCI bus contains 32 AD lines, permitting up to four bytes to be transferred in parallel at the same time.

Additional data can be sequentially transferred in the same manner, by placing the data on lines AD and asserting IRDY as shown at clock 9, while the target acknowledges receipt of the data by asserting TRDY as shown at clock 10. Both IRDY and TRDY are then deasserted at clock 11. This process can continue until the initiator reaches the last data transfer. On the last transfer, IRDY is asserted as usual, but FRAME is deasserted to indicate that no more data will follow this last transfer. When both IRDY and TRDY are subsequently deasserted the transfer sequence is over and the bus is idle again. FIG. 6 shows only two data transfers, labeled DATA 1 and DATA 2, so DATA 2 is the last transfer.

In this example, both REQ and GNT are shown asserted throughout most of the transfer, but there is no requirement for them to do so. They may be dropped as soon as the initiator takes control of the bus by asserting FRAME. The choice typically depends on how soon the arbiter is to resume searching for the next requestor.

Figure 7:
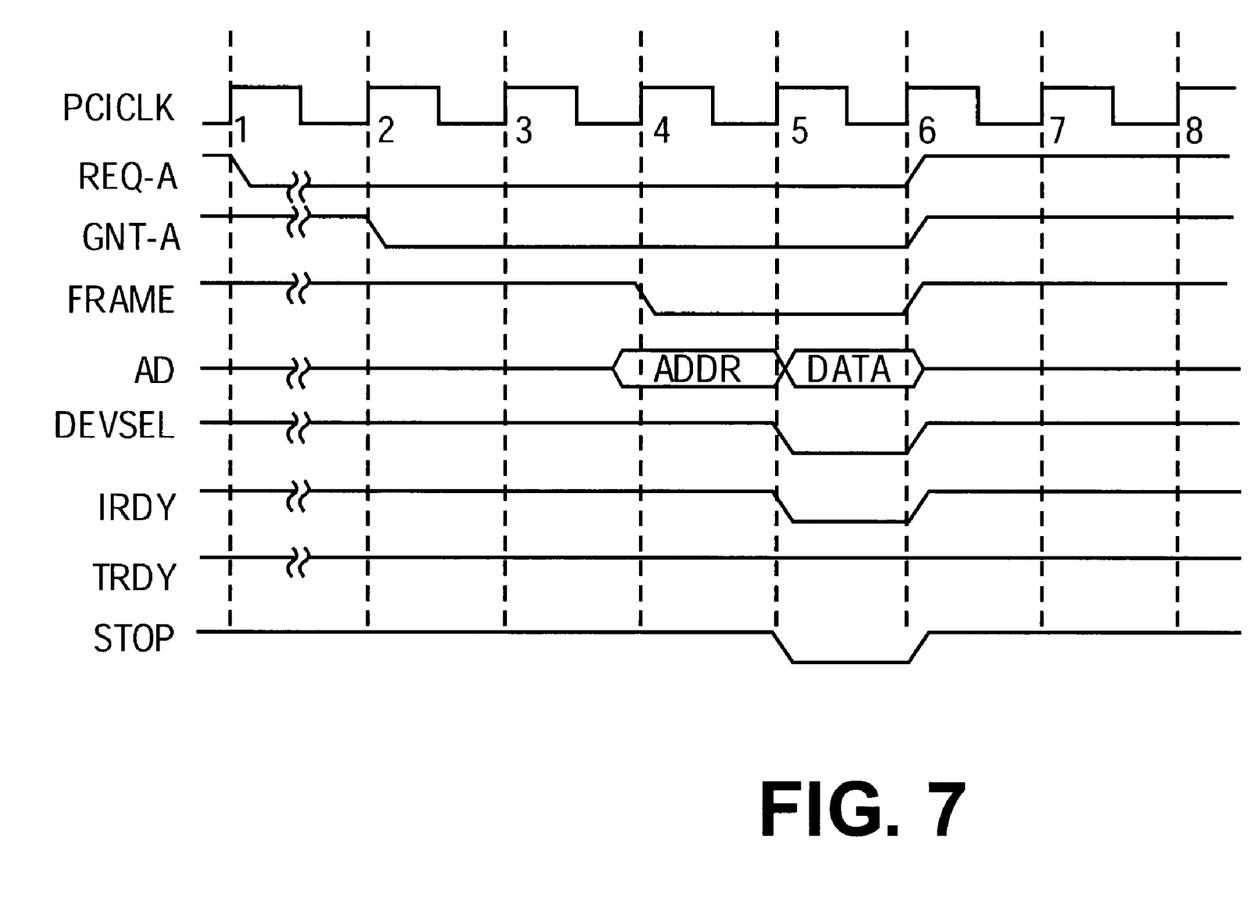
FIG. 7 shows a timing diagram of a PCI retry response.

If the addressed device recognizes its address but is not ready to handle a data transfer request for some reason (because it is busy, for example), it signals to the requester to abort the attempt and retry later. This is shown in FIG. 7. Everything proceeds normally until the start of clock 5. At that point, instead of asserting TRDY, the target device asserts STOP and leaves TRDY deasserted. This is a signal to abort the transfer, and both the requestor and target device deassert all lines at the next clock cycle. The requester then retries the transfer sequence at a later time, which might be as soon as the requestor can be granted another access to the bus by the arbiter.

The sequence of FIG. 7 can also be applied when inbound FIFO 56 becomes full during the middle of a transfer. When FIFO 56 becomes full, it generates a STOP signal rather than a TRDY signal in response to the IRDY signal from the initiating device, and the transfer is ended by deasserting all signals on the following clock. It is the responsibility of the initiating device to request the bus again and begin transmitting at the point of interruption when it is granted the bus again.

Referring to FIG. 5, if inbound FIFO 56 becomes full during a write transfer, or is already full when a write is attempted, bridge 51 will respond as shown in FIG. 7 to indicate the requested device is temporarily unavailable. In a conventional system, the arbiter will then resume scanning for other requesters as shown in FIG. 3, and the rejected requestor must request bus access again before it can retry the transfer. Under certain circumstances, this can lead to bus starvation for the rejected requester. For example, in FIG. 3 suppose that PCI agents PA1 and PA4 are both trying to initiate a sequence of write transfers to memory, while agents PA0, 2, 3, and 5 are not making any bus requests. PA1 is granted access first and fills up FIFO 56. PA1 then relinquishes the bus in response to the buffer full indication. The arbiter then scans through PA2 and PA3 (no requests) and grants access to the requesting PA4. Upon trying a transfer, PA4 receives a retry response because FIFO 56 is still full and cannot accept any more data. PA4 therefore aborts the transfer and relinquishes the bus. The arbiter then resumes scanning through PA5, 6 and 0 (no requests), before detecting and granting another request by PA1. By this time, FIFO 56 is no longer full and can accept more data, so it accepts the transfer from PA1, which fills up FIFO 56 again before relinquishing the bus. When PA4 is subsequently granted the bus again to perform its retry, FIFO 56 is again full and PA4 again receives a retry response. This cycle can repeat itself multiple times, effectively denying PA4 access to the bus until PA1 has completed all of its requested transfers.

The preceding descriptions refer to the FIFO being 'full', which can mean that one hundred percent of all locations in the FIFO contain unread data and there are no more locations available to receive additional data. In some systems, the latency period between filling up all locations and stopping the transfer in of additional data can be large enough to cause the buffer to be overrun. To prevent this, the FIFO may produce a buffer full signal when some predetermined portion of the FIFO locations are full, for instance ninety percent. This leaves enough of a safety margin so that the additional data has a place to go during the latency period.

Figure 8:
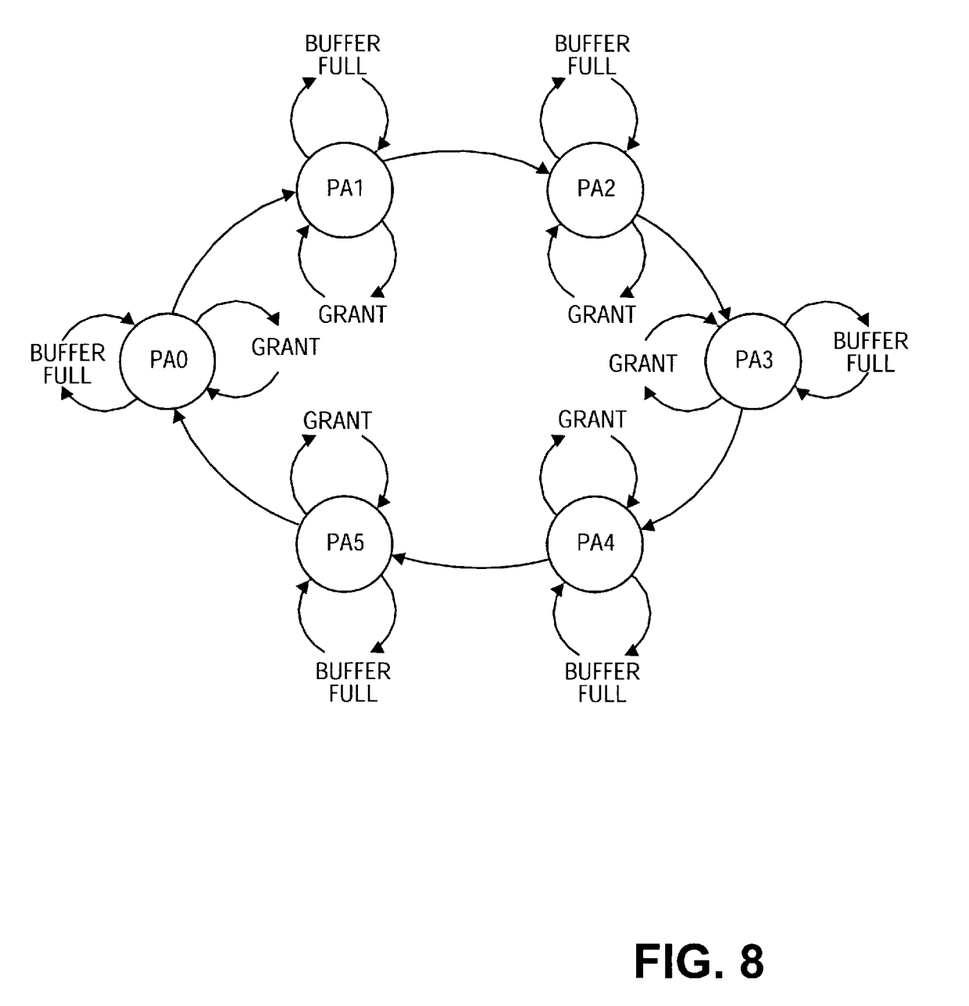
FIG. 8 shows a flow diagram of an arbiter of the invention.

FIG. 8 shows a flow diagram of how the arbiter of the invention avoids this starvation problem. As in a conventional system, the arbiter will sequentially and repetitively scan the request lines of all the PCI agents PA0–PA5. If a request is detected, the arbiter will pause at the request line for that agent and issue a grant to the requesting agent. Scanning is resumed when the granted agent takes control of the bus and subsequently deasserts its request line. In addition, scanning will pause whenever the inbound FIFO is detected to be full. Using the previous example, if PA1 fills up the buffer and releases the bus, the arbiter will not resume scanning until the buffer is no longer full. When it resumes scanning, it will detect and grant the request from PA4. But now when PA4 tries to transfer data, the buffer will not be full and PA4 will be allowed to perform the transfer. When PA4 fills up the buffer and relinquishes the bus, scanning will not resume until the buffer is no longer full, so when the scanner reaches PA1 again, the buffer will not be full and PA1 will be able to successfully begin a transfer. In this manner, each agent has a chance to transfer some data and bus starvation is avoided for all bus requestors.

A buffer full indication can stop the arbiter from scanning if scanning is taking place, and can also prevent the arbiter from resuming a scan if the arbiter has already stopped scanning to grant a bus request. Thus a pause in scanning due to a buffer full indication can be independent of a pause in scanning to grant a bus request.

The invention can be implemented in circuitry, including in a state machine, or as a method. The invention can also be implemented as instructions stored on a machine-readable medium, which can be, read and executed by at least one processor to perform the functions described herein. A machine-readable medium includes any mechanism for storing or transmitting information in a form readable by a machine (e.g., a computer). For example, a machine-readable medium can include read only memory (ROM); random access memory, (RAM); magnetic disk storage media; optical storage media; flash memory devices; electrical, optical, acoustical or other form of propagated signals (e.g., carrier waves, infrared signals, digital signals, etc.), and others.

The foregoing description is intended to be illustrative and not limiting. Variations will occur to those of skill in the art. Those variations are intended to be included in the invention, which is limited only by the spirit and scope of the appended claims.

I claim:

1. An apparatus, comprising:
   computer bus arbitration logic to repetitively scan first and second bus request lines, the arbitration logic comprising
      a first input coupled to the first request line to receive a first request signal;
      a first output to provide a first grant signal in response to receiving the first request signal;
      a second input coupled to the second request line to receive a second request signal;
      a second output to provide a second grant signal in response to receiving the second request signal;
      a third input to receive a buffer full signal; and
      control logic coupled to the first, second, and third inputs to pause scanning in response to receiving the buffer full signal, and to not resume scanning until the buffer full signal is not received.

2. The apparatus of claim 1, wherein the first and second bus request lines are for a PCI bus.

3. The apparatus of claim 1, further comprising a first-in first-out buffer coupled to the third input to provide the buffer full signal when a predetermined portion of the first-in first-out buffer is full.

4. The apparatus of claim 3, wherein the predetermined portion is 100 percent.

5. The apparatus of claim 1, wherein the arbitration logic includes a state machine.

6. A computer system, comprising:
   a first computer bus and a second computer bus;
   a bus bridge coupled between the first and second computer buses, wherein the bus bridge includes arbitration logic to repetitively scan first and second bus request lines from the first computer bus, the arbitration logic comprising
      a first input coupled to the first request line to receive a first request signal;
      a first output to provide a first grant signal in response to receiving the first request signal;

a second input coupled to the second request line to receive a second request signal;

a second output to provide a second grant signal in response to receiving the second request signal;

a third input to receive a buffer full signal; and control logic coupled to the first, second, and third inputs to pause scanning in response to receiving the buffer full signal, and to not resume scanning until the buffer full signal is not received.

7. The system of claim 6, wherein the first computer bus is a PCI bus.

8. The system of claim 7, wherein the bus bridge further comprises a first-in first-out buffer coupled between the first and second buses to buffer data between the first and second buses, the first-in first-out buffer being further coupled to the third input to provide the buffer full signal when a predetermined portion, of the first-in first-out buffer is full.

9. The system of claim 8, wherein the predetermined portion is 100 percent.

10. The system of claim 7, wherein the arbitration logic includes a state machine.

11. A method, comprising:

scanning a first and a second request lines with computer bus arbitration logic to detect requests to transfer data over a bus, wherein the computer bus arbitration logic is operable to output a first and a second grant signals in response to receiving, respectively, a first and a second request signals from the first and the second request lines, respectively;

pausing scanning when a buffer full signal from a first-in-first-out buffer (FIFO) is received; and resuming scanning when a buffer not-full signal is received.

12. The method of claim 11, further comprising:

pausing scanning when a request signal from a bus requestor is received;

providing a grant signal when the request signal is received; and resuming scanning after the grant signal is provided if the buffer not-full signal is received.

13. The method of claim 12, further comprising transmitting data into the FIFO after the grant signal is provided.

14. The method of claim 12, wherein the buffer full signal is provided by the FIFO when a predetermined portion of the buffer is full.

15. The method of claim 14, wherein the predetermined portion is one hundred percent.

16. The method of claim 12, wherein scanning includes sequentially and repetitively examining the first and second request lines for request signals.

17. Scanning a first, and a second request lines with computer bus arbitration logic to detect requests to transfer data over a bus, wherein the computer bus arbitration logic is operable to output a first and a second grant signals in response to receiving, respectively, a first and a second request signals from the first and the second request lines, respectively.

18. The medium of claim 17, further comprising:

pausing scanning when a request signal from a bus requestor is received;

providing a grant signal when the request signal is received; and resuming scanning after the grant signal is provided if the buffer not-full signal is received.

19. The medium of claim 18, further comprising transmitting data into the first-in first-out buffer after the grant signal is provided.

20. The medium of claim 18, wherein the buffer full signal is provided by the first-in first-out buffer when a predetermined portion of the first-in first-out buffer is full.

21. The medium of claim 20, wherein the predetermined portion is one hundred percent.

22. The method of claim 20, wherein scanning includes sequentially and repetitively examining the first and second request lines for request signals.

* * * * *